(12) United States Patent
Gyllenspetz et al.

(10) Patent No.: US 6,676,162 B2
(45) Date of Patent: Jan. 13, 2004

(54) OCCUPANT RESTRAINT BELT PRESENTER

(75) Inventors: Per Gyllenspetz, Gothenburg (SE); Bjorn Lundell, Gothenburg (SE); Gunnar Nilsson, Karna (SE); Henrik Wiberg, Gothenburg (SE); Per Ferdell, Goteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,682

(22) Filed: Apr. 24, 2002

(65) Prior Publication Data

US 2003/0201635 A1 Oct. 30, 2003

(51) Int. Cl.[7] .................................. B60R 22/03
(52) U.S. Cl. .................. 280/808; 297/481; 297/483
(58) Field of Search ........................... 280/808, 801.1; 297/483, 481, 468

(56) References Cited

U.S. PATENT DOCUMENTS

| | | | | |
|---|---|---|---|---|
| 4,600,217 A | * | 7/1986 | Naumann et al. | 280/808 |
| 4,687,254 A | | 8/1987 | Baumert et al. | |
| 5,431,446 A | | 7/1995 | Czarnecki et al. | |
| 6,193,275 B1 | * | 2/2001 | Knox | 280/808 |
| 6,237,945 B1 | | 5/2001 | Aboud et al. | |
| 6,382,666 B1 | * | 5/2002 | Devonport | 280/808 |
| 6,485,058 B1 | * | 11/2002 | Kohlndorfer et al. | 280/808 |
| 2002/0027344 A1 | * | 3/2002 | Decomps et al. | 280/733 |

FOREIGN PATENT DOCUMENTS

DE            3509984            6/1986

* cited by examiner

Primary Examiner—Peter C. English
(74) Attorney, Agent, or Firm—Gary A. Smith; Brooks & Kushman P.C.

(57) ABSTRACT

An inflatable belt presenter for use with an occupant restraint belt of a motor vehicle has a stored condition wherein the presenter is deflated and allows the restraint belt to assume a stowed position, and a deployed condition wherein the presenter is inflated and urges the belt to a graspable position in which the occupant can more easily grasp the belt prior to fastening it. The presenter is inflated by a source of gas pressure carried on board the vehicle, such as a compressor, pressure vessel, or a seat-mounted bladder after an occupant has been seated in the seat and is ready to don the restraint belt. Inflation of the presenter preferably occurs upon activation by an electronic control system that receives inputs from one or more vehicle systems, such as a seat weight sensor, a door open/closed sensor, and/or an ignition switch. The inflated presenter is flexible and compliant enough that it will not cause any discomfort to the seat occupant if it should contact the occupant's body. The belt presenter is usable with a belt extending from a lower anchor or from an upper anchor.

20 Claims, 3 Drawing Sheets

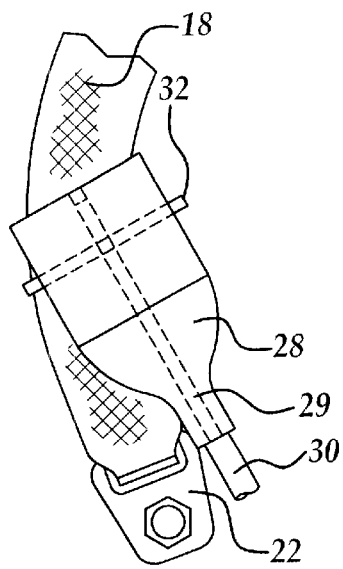
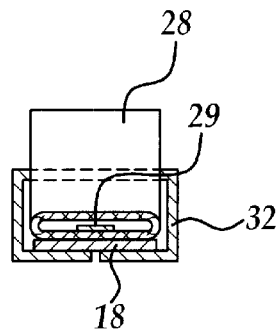
Figure 4
Figure 5
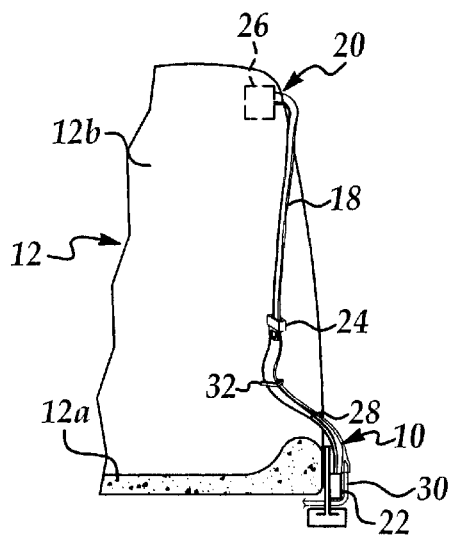
Figure 6
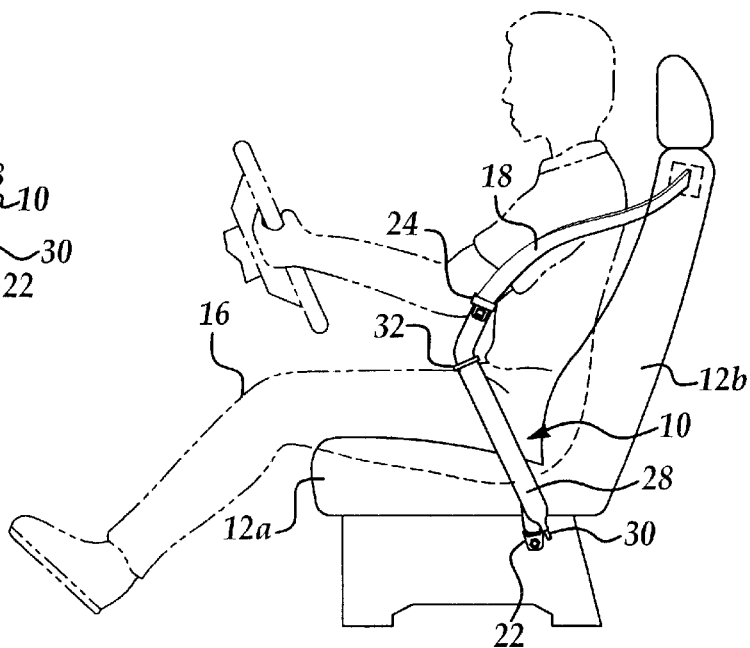
Figure 7

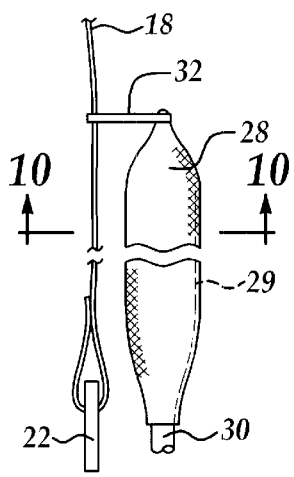
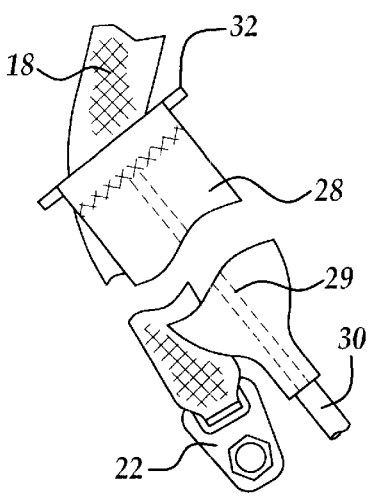
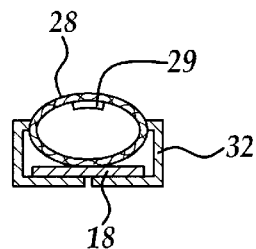
Figure 8
Figure 9
Figure 10
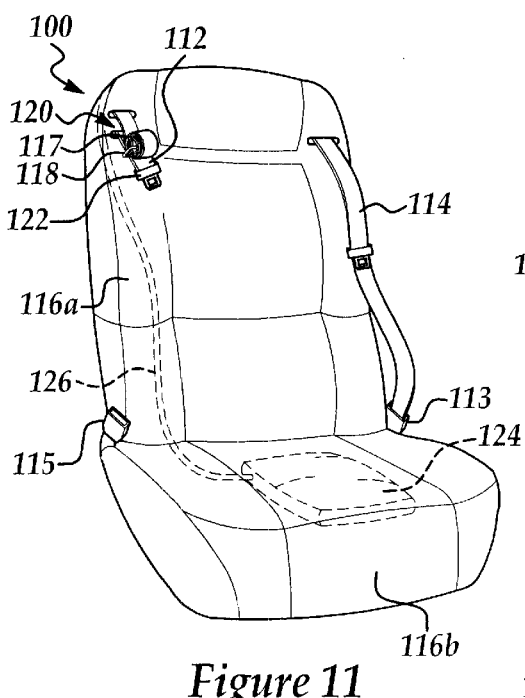
Figure 11
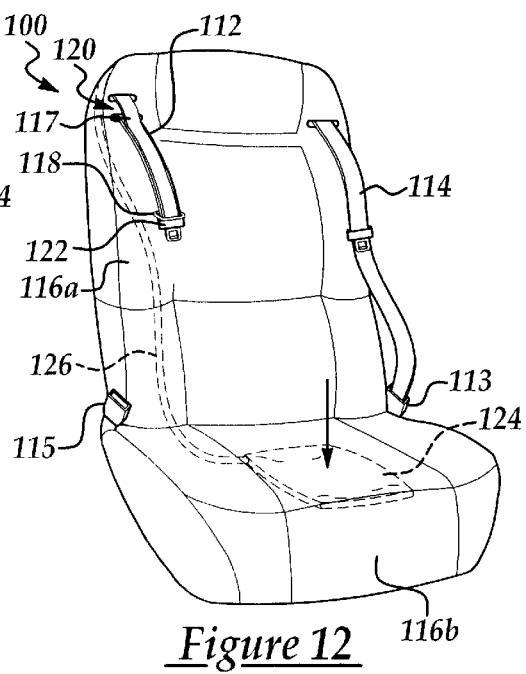
Figure 12

OCCUPANT RESTRAINT BELT PRESENTER

BACKGROUND OF INVENTION

The present invention relates generally to occupant restraint belts used in motor vehicles, and more specifically to a presenter for making a restraint belt easier for a person to see and grasp in order to fasten the belt.

Occupant restraint belts (also known as seat belts) are fitted to most types of passenger vehicles in order to protect vehicle occupants from injury during a crash or other abrupt deceleration of the vehicle. One limitation to the effectiveness of modern seat belts is that they require a voluntary and optional act by the occupant to fasten the belt properly around their body. Some persons do not use their vehicle's seat belts because they find it difficult or inconvenient to don the seat belt.

This difficulty in donning the belt is sometimes due to the fact that when the belt is in the unfastened condition, it must assume a stowed position in which it does not obstruct the occupant while entering or exiting the vehicle. Consequently, the seat belt is typically configured so that it is pulled to the rear by a retractor mechanism. With the belt in this stowed position, the buckles (or other portions of the belt) that the occupant must grasp in order to don the belt may be difficult to see and/or reach when in the seated position.

Systems have been proposed for moving a seat belt or buckle element upward and/or forwardly to a more easily grasped position after the occupant is seated in the seat. Examples of such systems are disclosed in U.S. Pat. Nos. 5,431,446 and 5,123,673.

SUMMARY OF INVENTION

The present invention provides a belt presenter for use with an occupant restraint belt associated with a seat of a motor vehicle. The belt presenter comprises an inflatable member disposed adjacent the seat and having a stored condition wherein the member is deflated and allows the restraint belt to assume a stowed position, and a deployed condition wherein the member is inflated and urges the belt to a graspable position in which the occupant can more easily grasp the belt prior to fastening it. The member is inflated by a source of gas pressure carried on board the vehicle, such as a compressor, a pressure vessel, or a pressure bladder after an occupant has been seated in the seat and is ready to don the restraint belt.

Inflation of the member preferably occurs upon activation by an electronic control system that receives inputs from one or more vehicle systems, such as a seat weight sensor, a door open/closed sensor, and/or an ignition switch. In another embodiment, the member is inflated by compression of a pressure bladder contained in the seat cushion when an occupant sits in the seat.

The inflated member is flexible and compliant enough that it will not cause any discomfort to the seat occupant if it should contact the occupant's body.

The invention belt presenter is usable with a belt extending from a lower anchor or from an upper anchor.

In a preferred embodiment of the invention, the inflatable member comprises a flexible tube attached to the motor vehicle adjacent the seat and having a free end with a connector slidably engaging the belt. The tube in the stored condition has a generally flat cross-section and is rolled into a spiral. In the deployed condition, inflation of the tube causes the tube to thicken in cross-section and to at least partially unroll such that the free end extends upwardly, forwardly, and inwardly. The belt slides through the connector as the tube urges the belt to the graspable position. A clock spring is provided to aid the tube in returning to its stored condition.

The present invention further includes a method of moving an occupant restraint belt associated with a seat of a motor vehicle from a stowed position to a graspable position. The method comprises the steps of: providing an inflatable member disposed adjacent the seat and having a stored condition wherein the member is deflated and allows the restraint belt to assume the stowed position; connecting a source of gas pressure to the member, the source of gas pressure operable to selectively inflate and deflate the member; and causing the source of gas pressure to inflate the member thereby moving the member to a deployed condition wherein the member urges the belt to the graspable position.

Other features and advantages of the present invention will be readily appreciated and better understood after reading the subsequent description when considered in connection with the accompanying drawings.

BRIEF DESCRIPTION OF DRAWINGS

FIG. 4 is a detail side view of the presenter of FIG. 1.

FIG. 5 is a cross-sectional view taken along line 5—5 of FIG. 3.

FIG. 6 is a front view the presenter in a deployed condition.

FIG. 7 is a side view of the presenter of FIG. 6.

FIG. 8 is a detail front view of the presenter of FIG. 6.

FIG. 9 is a detail side view of the presenter of FIG. 6.

FIG. 10 is a cross-sectional view taken along line 10—10 of FIG. 8.

FIG. 11 is a perspective view of a second embodiment of a presenter according to the invention as used with a shoulder belt, the presenter in a stored condition.

FIG. 12 is a view of the presenter of FIG. 11 in a deployed condition.

DETAILED DESCRIPTION

Figure 1:
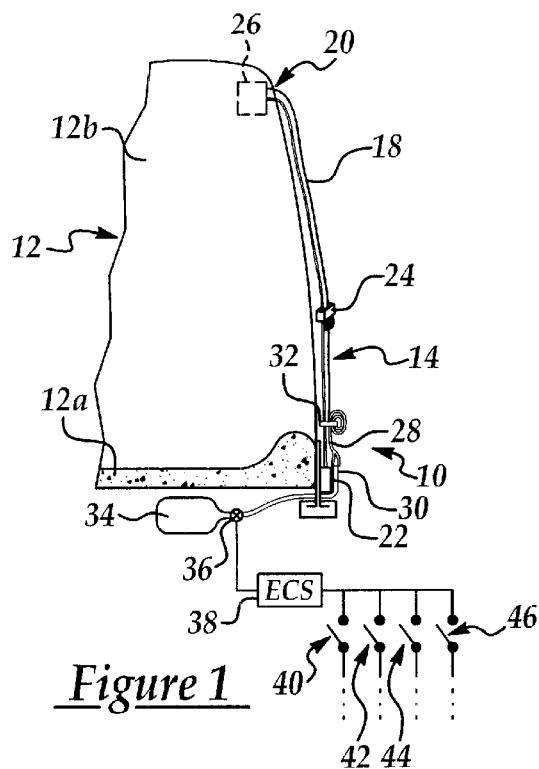
FIG. 1 is a front view of an embodiment of a seat belt presenter according to the present invention in combination with a vehicle seat, with the presenter in a stored condition.
Figure 2:
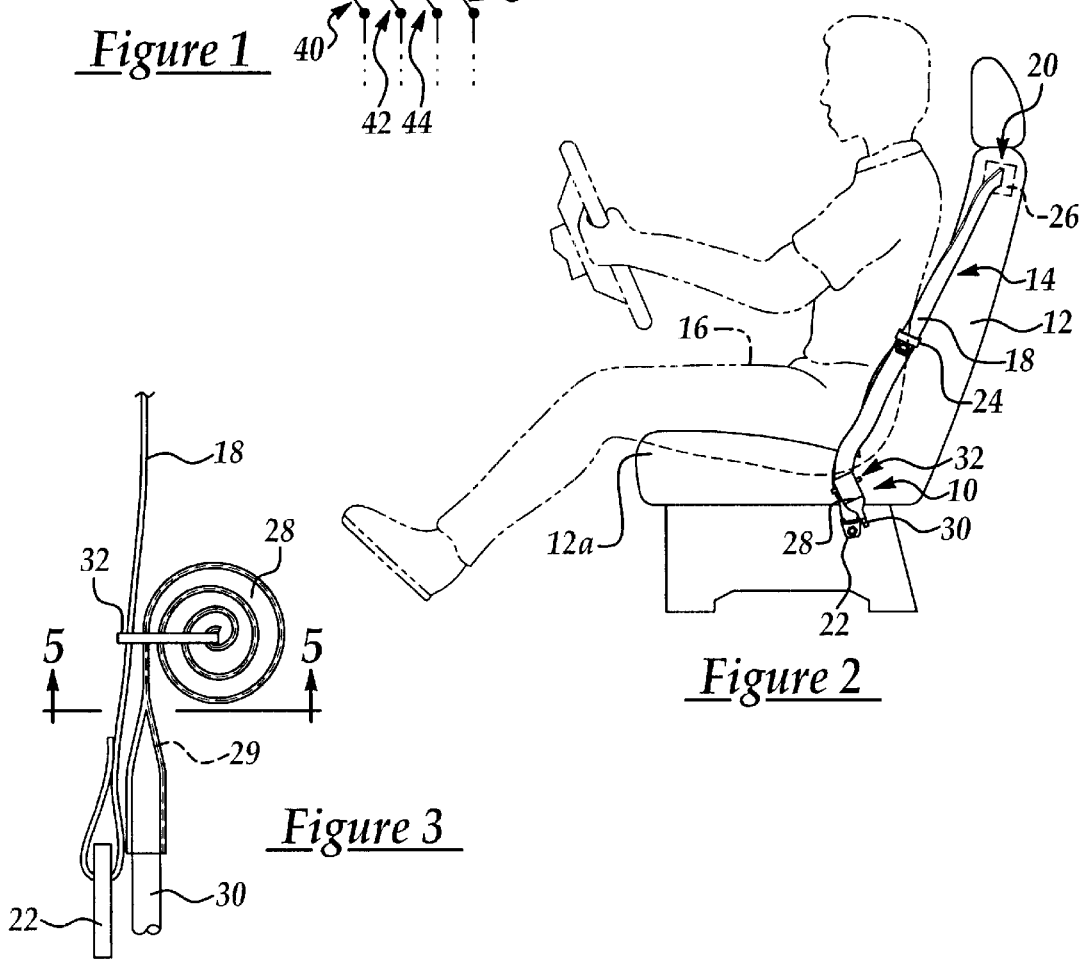
FIG. 2 is a side view of the presenter of FIG. 1.
Figure 3:
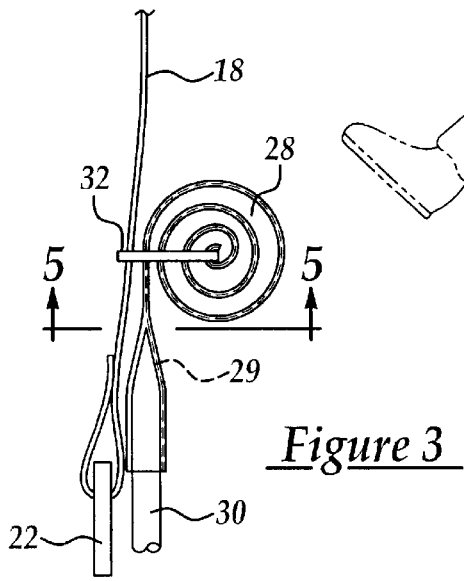
FIG. 3 is a detail front view of the presenter of FIG. 1.

Referring to FIGS. 1–10, an embodiment of a restraint belt presenter 10 according to the present invention is shown installed in a vehicle having a seat 12 and an associated three-point seat belt system 14 of the type well known in the art. Seat 12 includes a generally upright seat back 12b for supporting the torso of a seated occupant 16 (indicated in phantom lines) and a generally horizontal seat cushion 12a projecting forwardly from the bottom portion of the seat back for supporting the pelvis and thighs of the occupant. For purposes of description only, the seat 12 will be referred to herein as having an inboard side and an outboard side, these terms referring to the sides of the seat adjacent to a center of a vehicle and an exterior side of a vehicle respectively, as is the case if the seat is located on the left side of the vehicle. This disclosure applies equally to a seat located at any position within a vehicle.

The three-point belt assembly 14 comprises a length of flexible webbing 18 having an upper end secured to an upper anchor 20 adjacent the upper outboard portion of the seat back 12b, and a lower end secured to a lower anchor 22 adjacent the rear portion of the seat cushion 12a. A buckle element 24 such as a latch plate slides along the webbing 18 to allow adjustability, and is lockingly engageable with an inboard anchor (not shown) located adjacent the rear, inboard side of the seat cushion 12a. When buckle element 24 is lockingly engaged with the inboard anchor, the webbing 18 define a lap belt and a shoulder belt in a manner well known in the art to restrain the occupant 16 in the event of a crash or other abrupt deceleration of the vehicle.

As an alternative, the lap belt and shoulder belt may be formed as separate lengths of webbing connected by a fitting (not shown) that includes a buckle element engageable with the inboard anchor.

The upper anchor 20 preferably comprises a belt retractor 26 that may be housed within seat back 12b (as shown), or mounted to a portion of the vehicle structure such as a roof rail or B-pillar as is well known in the restraints art. The belt retractor 26 is operative to retract the webbing 18 when it is not fastened about the occupant 16, provide for adjustment of the length of the belt for varying-sized seat occupants, and properly position the seat belt restraint system, as is well known in the art. The belt retractor 26 may include load limiter and/or belt pretensioner devices (not shown) of the type well known in the restraints art.

Belt presenter 10 is disposed adjacent the lower anchor 22 and comprises a hollow tube 28 made of a flexible, impermeable material such as woven synthetic fibers. The material may be similar to that used for passenger protection airbags. The tube 28 is constructed to have a flat, strap-like cross-section, as seen in FIG. 5, and to maintain a rolled-up, spiral configuration. A clock spring 29 may be provided to aid in maintaining tube 28 in the spiral configuration. Clock spring 29 may be located inside of tube 28, as shown, or may be external to the tube.

A first or bottom end of the tube 28 is secured to the vehicle and/or the seat 12 adjacent the lower anchor 22 and receives a hose 30. See FIGS. 3 and 4. A second or free end of the tube 28 is closed and is located at the center of the spiral. A connector 32 is formed of a rigid material such as metal or plastic and is attached to the free end of tube 28. The connector 32 extends around the outside of the spiral-rolled tube 28 and encircles webbing 18, sliding freely with respect to the webbing.

Hose 30 extends to a gas pressure source 34 (see FIG. 1), which may be located anywhere on board the vehicle. Pressure source 34 preferably comprises a pressure vessel that is recharged by an air compressor (not shown). A valve 36 may be provided to control the flow of air from the pressure source 34 into the tube 28. Pressure source 34 may be used solely to power the belt presenter 10, or may supply pneumatic power to other vehicle systems such as an air suspension system (not shown).

An electronic control system (ECS) 38, indicated schematically in FIG. 1, controls pressure source 34 and/or valve 36 to control the flow of pressurized air from the pressure source through hose 30 into tube 28. ECS 38 receives signals from one or more vehicle systems, such as a seat weight sensor 40, a door status indicator switch 42, a buckle status switch 44, and an ignition switch 46.

Prior to occupant 16 being seated in seat 12, the three-point belt assembly 14 is in the stowed position in which the belt is unfastened and belt retractor 26 draws webbing 18 upward so that it extends in a substantially straight line between upper anchor 20 and lower anchor 22. Belt presenter 10 is in the stored condition shown in FIGS. 1–5 in which tube 28 is deflated and rolled into a spiral with connector 32 encircling the belt adjacent to lower anchor 22. In the stored condition, belt presenter 10 allows belt assembly 14 to assume the stowed position so that it does not interfere with seat occupant 16 entering or exiting the vehicle.

ECS 38 is operable to activate pressure source 34 and/or valve 36 to inflate the tube 28 after occupant 16 is seated in seat 12 and ready to don the seat belt. ECS 38 may, for example, automatically inflate tube 28 in response to a "seat occupied" indication from seat weight sensor 40, and/or a "door closed" indication from door condition sensor 42, and/or in response to an "on" indication from ignition key 46.

When tube 28 inflates it expands in cross-section so that it is no longer flat and unrolls against the force of clock spring 29, assuming a deployed condition shown in FIGS. 6–10. In the deployed condition, tube 28 is relatively rigid and extends upwardly, forwardly, and inwardly with respect to the seat 12 and occupant 16. The connector 32 slides along the webbing 18 as the free end of tube 28 urges the belt to the presented condition. The occupant 16 may then grasp the webbing 18 and pull it across his/her body to fasten buckle element 24 to the inboard anchor. Movement of the belt to the presented, graspable condition may require some amount of the webbing 18 to be drawn out of retractor 26, so presenter must operate with sufficient force to overcome the winding force of the retractor 26.

In the deployed condition, presenter preferably positions the belt adjacent or above the upper surface of the occupant's thigh and far enough forward and inward for the occupant to easily see and grasp the webbing 18. Tube 28 remains flexible and compliant when in the inflated condition so that it does not cause any discomfort to occupant 16 if it contacts the occupant's hip or thigh as it extends inward to present the belt.

After occupant 16 has fastened the seat belt, the tube 28 is deflated and clock spring 29 urges the tube to return to its spiral-rolled, stored condition. Deflation of the tube 28 is also controlled by ECS 38, and may be triggered by buckle sensor 44 indicating that the seat belt is properly fastened, by a timer, or by any other appropriate condition or combination of conditions of vehicle systems.

FIGS. 11 and 12 depict a belt presenter 100 according to the invention for use with a shoulder belt 112. In the depicted embodiment, shoulder belt 112 supplements a generally conventional three-point lap/shoulder belt 114 that deploys from the opposite side of seat 116a,b. When three-point belt 114 is fastened to inboard anchor 115 and shoulder belt 112 is fastened to outboard anchor 113, the result is a four-point restraint belt system. An example of such a 4-point belt system is disclosed in applicant's co-pending U.S. patent application Ser. No. 09/683,473, the complete disclosure of which is incorporated herein by reference. A presenter according to the present invention may, however, be applied to any type of shoulder belt, lap belt, or combined lap/shoulder belt.

The presenter 100 comprises an inflatable tube 117 mounted on seat back 116a adjacent an upper anchor 120, which preferably comprises a retractor (not shown) mounted inside of the seat back. A connector 118 secured to the end of tube 117 engages shoulder belt 112 immediately adjacent a buckle element 122 attached to the end of the shoulder belt. A pressure bladder 124 is disposed within the seat cushion 116b and contains a gas such as air. Pressure bladder 124 is connected with presenter 100 by a hose 126 extending through the seat.

When an occupant (not shown) sits on seat cushion 116b, pressure bladder 124 is compressed by the occupant's body weight, and at least a portion of the gas contained in the bladder is forced through hose 126, thereby inflating tube 117 and causing it to unroll from the spiral, stored condition (FIG. 11) to the relatively straight, deployed condition (FIG. 12).

Movement of presenter 100 from the stored condition to the deployed condition urges the buckle element 122 downwardly and forwardly, drawing the belt 112 outward from the retractor and placing the buckle element 122 is a position where it may be more easily grasped by the seat occupant As an alternative to being mounted externally on the seat back 116a, the presenter 100 may be mounted within the seat back 116a or on any vehicle structure adjacent the shoulder belt 112 and from which the presenter can, by moving from the stored condition to the deployed condition, urge the belt 112 toward a more easily grasped position. For example, the presenter 100 may be mounted to a vehicle B-pillar or a roof rail adjacent the upper portion of seat back 116a.

After the occupant has fastened the shoulder belt buckle element 122 to outboard anchor 113, tube 117 deflates and returns to its stored condition. The deflation may be achieved by, for example, an orifice (not shown) that slowly vents the internal pressure from presenter 100, or by a valve (not shown) controlled by a timer or vehicle systems in a manner similar to that described in relation to the first embodiment of the invention.

As is apparent from the above description, the invention belt presenter provides a simple, effective, and unobtrusive apparatus for positioning a seat belt in an easily grasped position, thereby making it more convenient and comfortable for a seat occupant to properly fasten and wear the belt. The presenter is compliant even when in the inflated, deployed condition so that it will not cause discomfort if it should contact the occupant. This allows the presenter to work comfortably and effectively for occupants of any size and stature.

While the best modes for carrying out the invention have been described in detail, those familiar with the art to which this invention relates will recognize various alternative designs and embodiments for practicing the invention as defined by the appended claims.

What is claimed is:

1. A belt presenter for use with an occupant restraint belt associated with a seat of a motor vehicle, the belt presenter comprising:
   an inflatable member disposed adjacent the seat and having a stored condition wherein the member is deflated and allows the restraint belt to assume a stowed position and a deployed condition wherein the member is inflated and urges the belt to a graspable positions; p1 wherein the member is rolled into a spiral in the stored condition and is at least partially unrolled in the deployed condition.

2. The apparatus according to claim 1 further comprising a source of gas pressure connected with the member and operable to alternatively inflate and deflate the member.

3. The apparatus according to claim 2 further comprising a control system for controlling inflation of the member by the source of gas pressure.

4. The apparatus according to claim 2 wherein the source of gas pressure comprises a pressure bladder disposed in the seat, the pressure bladder inflating the member when compressed.

5. The apparatus according to claim 1 further comprising a connector attached to the member and engageable with the belt.

6. The apparatus according to claim 1 for use with a belt extending from a lower anchor adjacent a lower side portion of the seat, the member disposed adjacent the lower anchor and engaging a portion of the belt adjacent the lower anchor to urge the belt to the graspable position.

7. The apparatus according to claim 1 for use with a belt extending from an upper anchor adjacent an upper side portion of the seat, the member disposed adjacent the upper anchor and engaging a portion of the belt adjacent the upper anchor to urge the belt to the graspable position.

8. The apparatus according to claim 7 wherein the upper anchor comprises a belt retractor.

9. The apparatus according to claim 1 wherein the inflatable member comprises a flexible tube disposed adjacent the seat and having a free end, the tube in the stored condition having a generally flat cross-section and being rolled into a spiral, and in the deployed condition having a thicker cross-section and being at least partially unrolled such that the free end engages the belt to urge the belt to the graspable position.

10. The apparatus according to claim 9 for use with a belt extending from a lower anchor adjacent a lower side portion of the seat, the tube disposed adjacent the lower anchor and the free end engaging the belt adjacent the lower anchor to urge the belt to the graspable position.

11. The apparatus according to claim 10 wherein the belt extends between the lower anchor and an upper anchor adjacent an upper side portion of the seat.

12. The apparatus according to claim 9 wherein the tube when in the deployed condition urges the belt forward with respect to the seat.

13. The apparatus according to claim 9 wherein the tube when in the deployed condition urges the belt inward with respect to the seat.

14. The apparatus according to claim 9 further comprising a spring associated with the tube and urging the tube to the stored condition.

15. A method of moving an occupant restraint belt associated with a seat of a motor vehicle from a stowed position to a graspable position, the method comprising the steps of:
   providing an inflatable member disposed adjacent the seat and having a stored condition wherein the member is deflated and is rolled into a spiral and allows the restraint belt to assume the stowed position;
   connecting a source of gas pressure to the member, the source of gas pressure operable to selectively inflate and deflate the member; and
   causing the source of gas pressure to inflate the member thereby moving the member to a deployed condition wherein the member urges the belt to the graspable position.

16. The method according to claim 15 wherein the inflatable member comprises a flexible tube disposed adjacent the seat and having a free end, the tube in the stored condition having a generally flat cross-section and being rolled into a spiral, and in the deployed condition having a thicker cross-section and being at least partially unrolled such that the free end engages the belt to urge the belt to the graspable position.

17. The method according to claim 15 wherein the step of causing the source of gas pressure to inflate the member comprises utilizing a control system that automatically inflates the member in response to indications from at least one vehicle system.

18. The method according to claim 17 wherein the at least one vehicle system is selected from the group consisting of a seat weight sensor, a door condition sensor, and an ignition system.

19. The method according to claim 15 further comprising the step of providing a connector attached to the member and engaged with the belt.

20. A belt presenter for use with an occupant restraint belt associated with a seat of a motor vehicle, the belt presenter comprising:

a flexible tube disposed adjacent the seat and having a free end, the flexible tube having a stored condition wherein it is generally flat in cross-section and is rolled into a spiral, and a deployed condition wherein it has a thicker cross-section and is at least partially unrolled such that the free end engages the occupant restraint belt to urge the occupant restraint belt to a graspable position, wherein in the stored condition the flexible tube is deflated and allows the occupant restraint belt to assume a stowed position and in the deployed condition the flexible tube is inflated and urges the belt to the graspable position.

\* \* \* \* \*